Figure 1:
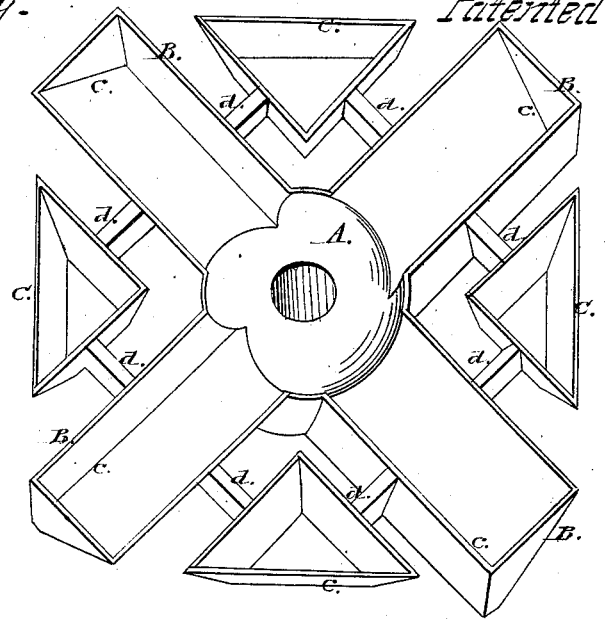

L. T. Newell,
Reciprocating Churn,

No. 104,189.  Patented June 14, 1870.

Witnesses:
Alex. Selkirk
Charles Selkirk

Inventor:
Lewis T. Newell

United States Patent Office.

LEWIS T. NEWELL, OF GENEVA, OHIO.

Letters Patent No. 104,189, dated June 14, 1870; antedated May 20, 1870.

IMPROVEMENT IN CHURN-DASHERS.

The Schedule referred to in these Letters Patent and making part of the same.

To all whom it may concern:

Be it known that I, LEWIS T. NEWELL, of Geneva, State of Ohio, have invented certain new and useful Improvements in Churn-Dashers, of which the following is a specification.

The first part of my invention relates to the form of the main dash, which is constructed in such a manner on its upper surface as will, when operating vertically through the cream or milk, be capable of imparting to the cream or milk a rotary motion, which rotary motion of the cream, together with the vertical motion of toe dasher, will cause the butter to be made more quickly, by reason of a greater action on the globules containing the butter being effected by such a rotating of the cream.

The second part of my invention relates to forming in the under side of the main dash, air-cells, that shall be capable of not only carrying air from above down into the cream or milk being operated upon, but shall also tend, by the form of the said cells, to discharge the air from such cells into the cream to further act upon the globules of butter.

The third part of my invention relates to supplementary dashers attached to and acting with the main dash, and formed in such a manner as to be capable, in the downward stroke of the dash, of compressing and forcing through the said supplementary dashes the cream and milk, while in raising, they will tend to part, through therefrom, and greatly agitate the cream.

In the drawing—

A represents the main dash of a churn, provided with an eye to receive the usual staff or handle.

B B are the wings of the said dasher, which wings have their upper surfaces so formed that they will be beveled or sloped up from their lower edge at one side to the top on the other edge. These beveled or sloping surfaces $b$ may be perfectly flat or level, or may be slightly convex or concave, so long as the said bevel or slope is maintained. A dash may be made to consist of several of these wings B.

Into the lower surfaces of the wings B I form air-receptacles or chambers $c$, fig. 1, which chambers will carry the air down into the body of the cream, and, by the pressure of the fluid and the rotary motion imparted to the same, the air carried by the said chambers $c$ will be discharged into the mass and permeate the same.

Figure 2:
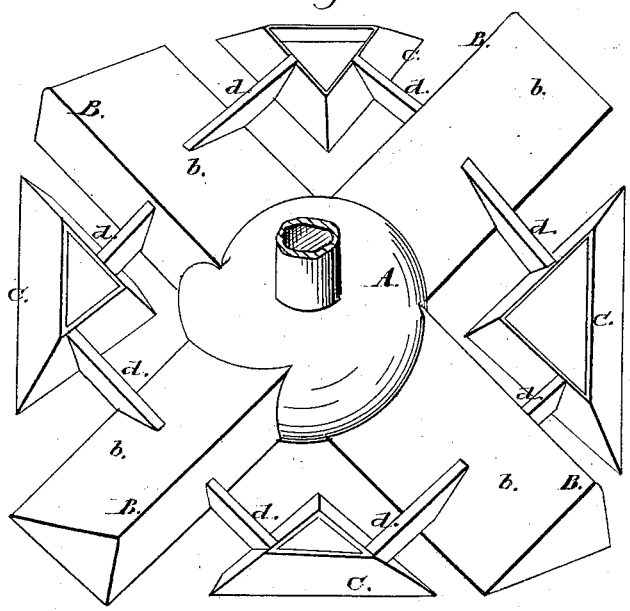

C C are supplementary dashers, which are of triangular pyramidal form, and truncated at its top, and perforated, as shown in fig. 2, on their outside, while their under and inner sides are the same, and wider at their bases than the openings in the top, so as to tend to contract or compress the fluid to be acted upon, and to cause it to jut or boil up when worked vertically down, and when raised up will cast off the fluid from its sides, and cause the cream to pour into the openings in the top. Should the dashes C have given to them a round, conical, or oval conical form, or any angular or other form, with a wider base than opening, the result would be substantially the same.

I also construct or finish my dasher with a glazed surface, either by making them of glass or glazed earthenware, or of iron, and enameling the same, so that the surfaces in contact with the milk or cream will not be effected by or itself affect the said milk or cream.

The dashes C may be connected with the main dash A by means of the arms $d$, as shown in figs. 1 and 2, or in any other suitable manner, so long as the said dashes C shall not be placed above the line of the upper surfaces of the wings B and over the same.

The manner in which this dasher operates with the milk or cream being operated upon is as follows:

The dasher being forced down vertically, causes the cream to raise upon the beveled surface $b$, as shown by arrows in fig. 2, and give to the cream a rotating motion.

The air-chambers $c$, at the same time, carry air from above down into the fluid, where it is worked into the cream, and permeates the same, thereby further increasing the agitation of the milk being operated upon.

The supplementary dashes C, in their downward course through the cream, gather in and contract the same, and cause it to jut or boil up, thereby increasing the agitation of the cream, while their upward course through the fluid will operate the same in a reversed manner.

I do not claim as my invention the forcing of air into the cream in any manner, as forcing the air into the cream or milk, by means of tubes and valves, have been used; also by means of supplementary dashes placed above the main dashes, either from the staff or from the main dash, none of which I claim, for in my invention I use the air-chamber when only placed beneath the main dash, as has been described.

Having described my invention,

What I claim, and desire to secure by Letters Patent, is—

1. A dash, A, constructed with wings B, furnished with beveled or sloping upper surfaces $b$, substantially as and for the purpose set forth.

2. The air-chamber $c$, when formed in the under side of the wings of the main dash A, substantially as and for the purpose set forth.

3. The supplementary dashers C, constructed and arranged substantially as and for the purpose set forth.

LEWIS T. NEWELL.

Witnesses:
ALEX. SELKIRK,
CHARLES SELKIRK.